United States Patent Office 2,699,394
Patented Jan. 11, 1955

2,699,394

PRODUCTION OF PHOTOGRAPHIC DYE IMAGES

Bela Gaspar, Beverly Hills, Calif.

No Drawing. Application December 15, 1950,
Serial No. 201,073

12 Claims. (Cl. 95—88)

This invention relates to color photography and more particularly to processing baths and compositions to be used in the production of azo dye images, and to the procedure for employing such baths and compositions for this purpose.

It is known that azo dye images can be produced from metallic, e. g. silver, images by treating materials, diffusely dyed with azo dyes and comprising such metallic images, in acid baths whereby said azo dyes are discharged or destroyed at the places of the metallic deposit by formation of complex compounds of such deposit with elements of the treating bath, and the metal is dissolved out simultaneously with destruction of the dyestuff leaving a reversed dye image. Suitable acid baths for this purpose are disclosed, e. g. in U. S. Patents 2,020,775 and Reissue Patent 22,308.

The dye bleaching baths disclosed in said patents consist essentially of an acid such as sulfuric, hydrohalic or citric acid, a complex former for silver ions such as an alkali halide or thiourea, and an accelerator such as a quinoxaline.

The baths hitherto disclosed have the disadvantage that the handling of their components by inexperienced operators is not without danger; e. g. concentrated sulfuric acid must be handled with extreme care, and concentrated hydrohalic acids can be handled only in rooms with adequate ventilation. The shipping of said acids in concentrated form is hazardous, and the shipping of said acids in diluted form involves unnecessary bulk and therefore increases the cost of the bath.

Among the acids hitherto used for the preparation of dye bleach baths, citric acid is not hazardous; but this acid is very weak, and produces satisfactory results only with a limited number of easily bleaching azo dyes. Many other azo dyes do not bleach well in citric acid bleaching baths but require bleaching baths containing stronger acids such as sulfuric or hydrohalic acids.

Preparing the dye bleach baths from locally available ingredients at the place of processing cannot be recommended, since this involves sources of error and since the purity of the ingredients changes from batch to batch.

It is therefore an object of the present invention to prepare dye bleach baths comprising acids which are not hazardous if used, according to directions, in professional film processing laboratories or in amateur darkrooms. Another object is the provision of pasty to dry solid dye bleach concentrate compositions including such acids and adapted to be readily dissolved to form suitable dye bleach baths. Still another aim of the invention is to provide processes for producing a photographic dye image in a photographic emulsion diffusely colored with an azo dye and also containing a metal, e. g. silver, image by treatment with the above dye bleach baths. Other objects and advantages will appear as the description of the invention proceeds.

In accordance with the invention, the foregoing objects and advantages are accomplished by treatment of the metal, usually silver, image in a photographic emulsion diffusely colored with an azo dye, with a solution containing a compound which furnishes in solution an ion having the formula $RSO_3^-$ where R is a member of the group consisting of organic radicals and radicals of the formula $R_1R_2N-$ where $R_1$ and $R_2$ are each members of the group consisting of hydrogen and organic radicals, said solution being non-destructive with respect to the dye but reacting with said metal image to oxidize it and substantially simultaneously to form a reducing substance which destroys said dye at the point of said metal image, the acidity of said solution being essentially due to said compound.

The expression "organic radical" as employed herein is intended to denote radicals containing at least one carbon atom, including aliphatic, cycloaliphatic, aromatic and heterocyclic groups, and mixed groups of these types such as aliphatically substituted aromatic and heterocyclic groups. These organic radicals may further carry substituents including alcoholic, carboxylic, halogen radicals and the like.

I have found that bleaching baths comprising sulfonic acid compounds furnishing the above-noted $RSO_3^-$ ion in solution are as efficient as those comprising heretofore employed hydrohalic or sulfuric acids. The sulfonic acid compounds employed for producing the above-noted $RSO_3^-$ ion in solution may be the corresponding free acids $RSO_3H$, where R has the values defined above, or certain hereinafter described salts thereof. Such compounds generally dissolve readily in water to give solutions which are easier on the skin of an unprotected operator, on the photographic material and on the equipment than are the solutions containing the strong acids hitherto used. No noxious fumes emanate from the baths of this invention, and they may be kept and used in glass, enamel, hard rubber or stainless steel equipment.

As indicated above, one class of sulfonic acid compounds suitable for the purposes of the invention constitutes compounds containing the $R_1R_2N-$ radical connected to the $-SO_3-$ group. In this case both $R_1$ and $R_2$ may be hydrogen to form the commercially important sulfamic acid compounds containing the radical $NH_2SO_3^-$. Alternatively $R_1$ may be hydrogen and $R_2$ an organic radical, or vice versa, or $R_1$ and $R_2$ may both be the same or different organic radicals, in each instance forming substituted sulfamic acid compounds. Such substituted sulfamic acids may be further substituted by attachment of alcoholic and like substitutents to the organic radical.

The preferred class of sulfonic acid compounds employed in the invention may be defined as compounds which furnish in solution an ion having the formula $R_3(SO_3^-)_n$ where $R_3$ is an organic radical selected from the group consisting of alkyl, cycloalkyl, aryl, alkaryl, aralkyl and heterocyclic, which organic radicals may be unsubstituted or may carry substituents such as sulfonic, carboxylic, alcoholic, aldehydic, halogen groups and the like, and $n$ is an integer from 1 to 3.

Suitable specific acids for use in the dye bleach compositions of the invention include Ethanesulfonic acid,
p-Toluenesulfonic acid,
Benzylsulfonic acid,
Ethylenedisulfonic acid,
Cyclohexanesulfonic acid,
Benzene-1,3-disulfonic acid
Naphthalene-1,5-disulfonic acid,
2,5-dibromobenzenesulfonic acid,
Naphthalene-1,3,5-trisulfonic acid,
Sulfoacetic acid,
m-Sulfobenzoic acid,
2,4-disulfobenzoic acid,
5-chloro-3-sulfopyromucic acid,
2-naphthol-1-sulfonic acid,
Sultone of 2-naphthol-3,6,8-trisulfonic acid,
1-hydroxyethane-2-sulfonic acid,
N-acetylsulfanilic acid,
Monothiooxanilide-4-sulfonic acid,
Reychler's camphorsulfonic acid,
Aminosulfonic acid (sulfamic acid),
Monomethyl sulfamic acid,
Diethyl sulfamic acid,
Methylol sulfamic acid, etc.

In place of using the free sulfonic acids noted above for producing the herein described dye bleach baths, those water-soluble salts of such acids may be employed which produce strongly acidic solutions. Examples of such salts are those of the sulfonic acids hereof with weak bases which are hydrolyzed in solution, e. g. thiourea or ammonium hydroxide, or with the acid alkali salts of polysulfonic acids, e. g. the acid sodium salt of naphthalene-1,5-disulfonic acid. Mixtures of the various sulfonic acid compounds including the free acids and/or the above noted salts thereof may also be used. Where the free sulfonic acids or suitable salts thereof are utilized, these compounds when dissolved in the treating baths of the invention, furnish the $RSO_3^-$ ion in solution, where R represents the values noted above. The sulfonic acid compounds of the invention are incapable of reduction to products which are reoxidizable to the original compound during treatment of the silver image.

Photographic materials comprising gelatin or other hydrophilic colloids soften much less in the sulfonic acid-containing baths of this invention than they do in sulfuric or hydrohalic acid baths of comparable ionic strength. This is particularly the case in baths comprising organic polyvalent acids such as sulfosuccinic acid or naphthalene-1,5-disulfonic acid or in baths comprising organic sulfonic acids carrying suitable reactive groups such as benzaldehydesulfonic acid.

The amount of sulfonic acid compound utilized in the treating baths of the invention is such that the acidity of the bath is brought about primarily through the presence of such compound. The treating baths hereof may contain the sulfonic acid compounds described in quantity up to saturation thereof, amounting to as high as about 200 grams per liter of solution at 20° C. Where sulfamic acid is utilized as the chief acidic component of a dye bleach bath in accordance with the invention, up to 170 grams per liter of this compound may be employed.

Most of the sulfonic acids and corresponding suitable salts of this invention are solids which can be handled without danger while they are in the dry state. Many of them can be packed even in paper containers, and they can be kept indefinitely; some others are hygroscopic and should be kept in airtight containers.

The inertness of the baths containing the sulfonic acid compounds of this invention towards stainless steel, etc. is of particular importance when dye bleach baths are used in continuous processing plants, e. g. for movie film, or in other larger equipment where the choice of construction materials is limited.

Suitable compounds capable of forming complex ions with the metal or silver image are also incorporated in the baths of this invention. Such compounds may include, for example, sodium chloride and potassium bromide. However, preferred compounds for this purpose are urea, thiourea, guanidine, aminoguanidine, semicarbazide, thiosemicarbazide, thiodiglycolic acid and thiocyanates.

The presence of an accelerator for increasing the effectiveness of the dye destroying solutions of the invention is not indispensable; but improved results are obtained by incorporating in the baths of this invention minute amounts of accelerators of this type such as 2,3-diaminophenazine hydrochloride, anthraquinone-β-sulfonic acid or 2,3-dimethylquinoxaline. Such accelerators are reducible organic compounds, the reduction products of which are reoxidizable to the original material during treatment of the metal or silver image with the acid bleach bath.

The baths may or may not contain dispersing or wetting agents such as polyethyleneglycols and inert components such as sodium sulfate which regulate the penetration of the dye bleach bath into the photographic material, particularly into a photographic multilayer material. Other components of the mixtures may be a hardening agent such as chrome alum or trioxymethylene, to avoid the softening of the photographic colloid in the acid bath, or a precipitating or complex forming agent such as ethylenediamine tetraacetic acid which eliminates impurities from water of dubious quality so that the bath may be used under otherwise unfavorable conditions.

Preferably for marketing purposes, said complex formers, accelerators, etc. may be combined with the sulfonic acid compounds of the invention to form a pasty to dry solid concentrate composition from which a dye bleach bath can be readily prepared by simply dissolving such concentrate in water. Desirably such compositions are of a solid nature in the form of dry powder mixtures or compressed tablets or pellets. In these concentrates the free sulfonic acid may be chemically combined with one of the other components, e. g. with a complex former, such as in the salt of naphthalene-2-sulfonic acid with thiourea. If an excess of acid or an excess of complex former is desired, the thiourea naphthalenesulfonate can be mixed with thiourea or with naphthalene-2-sulfonic acid.

In preparing durable concentrates of this type, it should be observed that incompatible combinations must be avoided, e. g. a mixture of naphthalenetrisulfonic acid and sodium chloride evolves gaseous hydrochloric acid and therefore these components should be kept in separate compartments to be mixed only before use. In those cases where a bleach bath is desired which is particularly mild on the equipment but nevertheless efficient on the dyes to be bleached, the presence of larger amounts of halides which tend to evolve hydrohalic acids is undesirable. In these cases, organic complex formers such as thiourea are to be preferred.

Generally, a substantial or major portion of the dry to pasty concentrate compositions of the invention is composed of the sulfonic acids of the invention or the above-indicated suitable salts thereof. Under ordinary circumstances such compositions may contain these sulfonic acid compounds in a proportion of about 25–95% by weight of the composition, based on the free corresponding sulfonic acid.

The dry solid or paste mixtures of this invention are durable. Their bulk is reduced to a minimum. Their handling is simple and not hazardous. The preparation of a dye bleach bath of constant composition from these mixtures involves only measuring the water and dissolving the mixture, thus excluding all other sources of error. The dye bleach baths prepared from these mixtures are as efficient as those prepared according to the conventional but less safe procedure, without having the disadvantages of the known dye bleach baths; they do not fume and they are less harmful to the equipment, to the health of the operators and to the binding agent, e. g. gelatin, of photographic film or paper.

The following examples are illustrative of the invention:

*Example 1.*—A mixture of 100 grams of sulfamic acid and 4.5 milligrams of 2-hydroxy-3-aminophenazine hydrochloride are placed in a waxed paper box and hermetically sealed. A mixture of 174 grams of sodium chloride and 4 grams of thiourea are placed in a second box and sealed. These boxes can be kept indefinitely. The results are the same if the hydroxyaminophenazine is placed in the second box and/or the thiourea is placed in the first box.

Before use, the contents of both boxes are dissolved in water to make one liter of solution.

A multi-layer material, having different azo dyes diffusely incorporated in layers in which different color selection pictures are recorded, is treated in this solution. The dyes may be for example Diamine Pure Blue FF (Schultz, Farbstofftabellen, 7th edition, #510), Benzo Light Yellow 4 GL extra (Schultz, l. c. #308) and Fast Red VR (Schultz, l. c. #209). A dye image, reversed with regard to the silver image, is obtained.

*Example 2.*—A mixture of 1 kg. of thiourea β-naphthalenesulfonate and 0.2 gram of 2,3-diaminophenazine β-naphthalenesulfonate is made into tablets of 3.7 grams each. The tablets are kept under exclusion of humidity. A dye bleach bath for the processing of several small sheets of "Gasparcolor Opaque" color printing material is prepared by dissolving one tablet in 100 ml. of water.

In the above mixture the diaminophenazine may be replaced with another of the accelerators disclosed in U. S. Patent Re. 22,308, the thiourea β-naphthalenesulfonate may be replaced with thiourea+thiourea β-naphthalenesulfonate or with p-toluenesulfonic acid+thiourea β-naphthalenesulfonate. These different combinations act in a similar manner but require different dye bleach bath times and bleach more or less selectively the different azo dyes in a multi-layer material.

*Example 3.*—Other compositions which can be dissolved in aqueous solutions for bleaching the azo dyes in color film, plates or paper to obtain azo dye images, are the following, the quantities noted being suitable in each case for the preparation of 1 liter of solution:

m-Benzenedisulfonic acid hydrate (18 grams)
Thiourea (3 grams)
2,3-diaminophenazine sulfate (15 milligrams)

m-Benzenedisulfonic acid hydrate (18 grams)

Potassium bromide (15 grams)
Phenazine hydrochloride (120 milligrams)

2,5-dibromobenzenesulfonic acid hydrate (16 grams)
Thiourea (4 grams)
Thiocarbazide (3 grams)
Anthraquinone-$\beta$-sulfonic acid (1 gram)

Sulfosuccinic acid (34 grams)
Thiourea (6 grams)
2,3-dimethylquinoxaline (60 milligrams)

Naphthalene-1,3,5-trisulfonic acid (8 grams)
Thiourea (4 grams)
A solidified and powdered solution (25 milligrams) of 2-hydroxy-3-aminophenazine in ten times its weight of "Carbowax 4000" (a polyethyleneglycol, sold by Carbide & Carbon Chemicals Corp.)

Sulfamic acid (40 grams)
Thiourea (40 grams)
2,3-dimethylquinoxaline (0.1 gram)

Sulfamic acid (48.5 grams)
Thiourea (10.0 grams)
2-hydroxy-3-aminophenazine (5.0 milligrams)

Sulfamic acid (10 grams)
Thiourea sulfamate (35.0 grams)
2,3-diaminophenazine (2.2 milligrams)

Sulfamic acid (150.0 grams)
Thiourea (10.0 grams)
2,3-diaminophenazine (9.0 milligrams)
  (This bath is particularly suitable where a rapid bleaching bath is desired or where the photographic material to be bleached contains dyes which bleach slowly.)

Sulfamic acid (8.5 grams)
Thiosemicarbazide (4.5 grams)
Phenazine (0.1 gram)
  (This bath is particularly suitable where a mild bleaching bath is desired or where the photographic material to be bleached contains easily reducible dyes such as those disclosed in Gaspar, U. S. 2,356,759 and 2,470,769.)

I am aware that dye bleach baths are already known which may contain minute quantities of sodium indigo sulfonate, benzene-1-sulfonic-3-sulfinic acid, anthraquinone-2-sulfonic acid or quinizarine sulfonic acid. Such compounds serve as accelerators in the baths which are acidic due principally to the presence of other acids such as sulfuric or hydrochloric. According to the present improvements, however, the strongly acidic reaction of the bleaching bath is essentially due to the presence of the sulfonic acid compounds of the invention which are generally employed in comparatively larger amounts than the above-noted accelerators. Further, these accelerators are reducible organic compounds, the reduction products of which are reoxidizable to the original material during treatment of the metal or silver image with the acid bleach bath, whereas the sulfonic acid compounds of the invention do not possess these reducible and reoxidizable properties.

Since various changes and modifications may be made in the invention without departing from the spirit thereof, the invention is to be taken as limited only by the scope of the appended claims.

I claim:

1. A process of producing a photographic dye image in a photographic emulsion diffusely colored with an azo dye and also containing a silver image which comprises treating said silver image with an acid solution containing essentially as the sole acid-producing material a substantial amount of a compound which furnishes in solution an ion having the formula $RSO_3^-$ where R is a member of the group consisting of organic radicals and radicals of the formula $R_1R_2N-$ where $R_1$ and $R_2$ are each members of the group consisting of hydrogen and organic radicals, said solution being non-destructive with respect to the dye but reacting with said silver image to oxidize it and substantially simultaneously to form a reducing substance which destroys said dye at the point of said silver image, said compound being incapable of reduction to products which are reoxidizable to the original compound during treatment of the silver image.

2. A process of producing a photographic dye image in a photographic emulsion diffusely colored with an azo dye and also containing a silver image which comprises treating said silver image with a strongly acid solution containing (a) essentially as the sole acid-producing material a substantial amount of a compound which furnishes in solution an ion having the formula $RSO_3^-$ where R is a member of the group consisting of organic radicals and radicals of the formula $R_1R_2N-$ where $R_1$ and $R_2$ are each members of the group consisting of hydrogen and organic radicals, and (b) a substance capable of forming complex ions with silver, said solution being non-destructive with respect to the dye but reacting with said silver image to oxidize it and substantially simultaneously to form a reducing substance which destroys said dye at the point of said silver image, and said compound being incapable of reduction to products which are reoxidizable to the original compound during treatment of said silver image.

3. A process of producing a photographic dye image in a photographic emulsion diffusely colored with an azo dye and also containing a silver image which comprises treating said silver image with a strongly acid solution containing (a) essentially as the sole acid-producing material a substantial amount of a compound which furnishes in solution an ion having the formula $R_1R_2NSO_3^-$ where $R_1$ and $R_2$ are each members of the group consisting of hydrogen and organic radicals, and (b) a substance selected from the group consisting of urea, thiourea, guanidine, aminoguanidine, semicarbazide, thiosemicarbazide, thiodiglycolic acid and thiocyanates, said solution being non-destructive with respect to the dye but reacting with said silver image to oxidize it and substantially simultaneously to form a reducing substance which destroys said dye at the point of said silver image, said compound being incapable of reduction to products which are reoxidizable to the original compound during treatment of the silver image.

4. A process of producing a photographic dye image in a photographic emulsion diffusely colored with an azo dye and also containing a silver image which comprises treating said silver image with an acid solution containing sulfamic acid and a substance capable of forming complex ions with silver, said solution being non-destructive with respect to the dye but reacting with said silver image to oxidize it and substantially simultaneously to form a reducing substance which destroys said dye at the point of said silver image.

5. An acid treating bath for producing a photographic dye image in a photographic emulsion diffusely colored with an azo dye and also containing a metal image, comprising (a) a substantial amount not less than about 48.5 grams per liter of solution of a compound which furnishes in solution an ion having the formula $RSO_3^-$ where R is a member of the group consisting of organic radicals and radicals of the formula $R_1R_2N-$ where $R_1$ and $R_2$ are each members of the group consisting of hydrogen and organic radicals, and (b) a substance selected from the group consisting of urea, thiourea, guanidine, aminoguanidine, semicarbazide, thiosemicarbazide, thiodiglycolic acid and thiocyanates, said bath being non-destructive with respect to the dye but capable of reacting with said metal image to oxidize it and substantially simultaneously to form a reducing substance which destroys said dye at the point of said metal image, said compound being incapable of reduction to products which are reoxidizable to the original compound during treatment of the silver image.

6. An acid treating bath for producing a photographic dye image in a photographic emulsion diffusely colored with an azo dye and also containing a silver image, comprising from about 48.5 grams to about 170 grams per liter of sulfamic acid and a substance selected from the group consisting of urea, thiourea, guanidine, aminoguanidine, semicarbazide, thiosemicarbazide, thiodiglycolic acid and thiocyanates, said bath being non-destructive with respect to the dye but capable of reacting with said silver image to oxidize it and substantially simultaneously to form a reducing substance which destroys said dye at the point of said silver image.

7. An acid treating bath for producing a photographic dye image in a photographic emulsion diffusely colored with an azo dye and also containing a silver image, comprising (a) a substantial amount not less than about 48.5 grams per liter of solution of a compound which furnishes in solution an ion having the formula $R_1R_2NSO_3^-$ where $R_1$ and $R_2$ are each members of the group consisting of hydrogen and organic radicals, and (b) a substance selected from the group consisting of urea, thiourea, guanidine, aminoguanidine, semicarbazide, thiosemicarbazide, thiodiglycolic acid and thiocyanates, said bath being non-destructive with respect to the dye but capable of reacting with said silver image to oxidize it and substantially simultaneously to form a reducing substance which destroys said dye at the point of said silver image, said compound being incapable of reduction to products which are reoxidizable to the original compound during treatment of the silver image.

8. A compatible pasty to solid composition of matter comprising (a) a compound which furnishes in solution an ion having the formula $RSO_3^-$ where R is a member of the group consisting of organic radicals and radicals of the formula $R_1R_2N-$ where $R_1$ and $R_2$ are each members of the group consisting of hydrogen and organic radicals, said compound essentially being the sole acid-producing material in said composition, and (b) a substance selected from the group consisting of urea, thiourea, guanidine, aminoguanidine, semicarbazide, thiosemicarbazide, thiodiglycolic acid and thiocyanates, said composition being capable of dissolving to form an acid bath for treating a photographic emulsion diffusely colored with an azo dye and containing a metal image to thereby produce a photographic dye image by destruction of the dye at the point of the metal image, said compound being incapable of reduction to products which are reoxidizable to the original compound during treatment of the silver image and said compound being present in a proportion of about 25 to 95% by weight of said composition based on the free sulfonic acid.

9. A compatible solid composition of matter adapted to be packaged comprising (a) a compound which furnishes in solution an ion having the formula $R_1R_2NSO_3^-$ where $R_1$ and $R_2$ are each members of the group consisting of hydrogen and organic radicals, and (b) a substance selected from the group consisting of urea, thiourea, guanidine, aminoguanidine, semicarbazide, thiosemicarbazide, thiodiglycolic acid and thiocyanates, said composition being capable of dissolving to form a bath for treating a photographic emulsion diffusely colored with an azo dye and containing a silver image, said bath being non-destructive with respect to the dye but reacting with said silver image to oxidize it and substantially simultaneously to form a reducing substance which destroys said dye at the point of said silver image said compound being incapable of reduction to products which are reoxidizable to the original compound during treatment of the silver image, said compound being present in a proportion of about 25-95% by weight of said composition based on the free sulfamic acid compound.

10. A compatible solid composition of matter adapted to be packaged comprising a substantial proportion of sulfamic acid and a substance selected from the group consisting of urea, thiourea, guanidine, aminoguanidine, semicarbazide, thiosemicarbazide, thiodiglycolic acid and thiocyanates, said composition being capable of dissolving to form a bath for treating a photographic emulsion diffusely colored with an azo dye and containing a silver image, said bath being non-destructive with respect to the dye but reacting with said silver image to oxidize it and substantially simultaneously to form a reducing substance which destroys said dye at the point of said silver image, said sulfamic acid being present in a proportion of about 25-95% by weight of said composition.

11. A compatible solid photographic processing composition adapted to be packaged comprising a substantial proportion of sulfamic acid and thiourea, said sulfamic acid being present in a proportion of about 25-95% by weight of said composition.

12. A process of producing a photographic dye image in a photographic emulsion diffusely colored with an azo dye and also containing a silver image which comprises treating said silver image with an acid solution containing sulfamic acid in an amount not less than about 48.5 grams per liter and a substance selected from the group consisting of urea, thiourea, guanidine, aminoguanidine, semicarbazide, thiosemicarbazide, thiodiglycolic acid and thiocyanates, said solution being non-destructive with respect to the dye but reacting with said silver image to oxidize it and substantially simultaneously to form a reducing substance which destroys said dye at the point of said silver image.

References Cited in the file of this patent

UNITED STATES PATENTS

| Number | Name | Date |
|---|---|---|
| 2,020,775 | Gaspar | Nov. 12, 1935 |
| 2,195,405 | Brubaker | Apr. 2, 1940 |
| 2,221,793 | Gaspar | Nov. 19, 1940 |
| 2,270,118 | Gaspar | Jan. 13, 1942 |
| 2,304,987 | Young | Dec. 15, 1942 |
| 2,412,674 | Crabtree et al. | Dec. 17, 1946 |
| 2,453,346 | Russell | Nov. 9, 1948 |
| 2,564,238 | Sprung | Aug. 14, 1951 |

FOREIGN PATENTS

| Number | Country | Date |
|---|---|---|
| 510,884 | Great Britain | Aug. 9, 1939 |